United States Patent [19]

Ohmitsu et al.

[11] Patent Number: 4,948,997

[45] Date of Patent: Aug. 14, 1990

[54] STARTER AND POWER GENERATOR AND ASSOCIATED MOTOR

[75] Inventors: Takashi Ohmitsu, Toyota; Tsutomu Mitsui, Chiryu, both of Japan

[73] Assignee: Aisin Seiki Kabushiki Kaisha, Kariya, Japan

[21] Appl. No.: 241,197

[22] Filed: Sep. 7, 1988

[30] Foreign Application Priority Data

Sep. 10, 1987 [JP] Japan .............................. 62-226955

Sep. 18, 1987 [JP] Japan .............................. 62-234557

[51] Int. Cl.[5] ........................ H02K 47/04; H02P 9/08

[52] U.S. Cl. ................................ 310/113; 310/68 R; 310/156; 322/11; 322/26; 290/38 R; 290/46

[58] Field of Search ............... 310/23, 68 R, 113, 156, 310/1 BD; 322/10, 11, 26, 94; 290/38 R, 46

[56] References Cited

U.S. PATENT DOCUMENTS

| | | | |
|---|---|---|---|
| 4,219,739 | 8/1980 | Greenwell | 290/38 R |
| 4,329,604 | 5/1982 | Dunstan et al. | 310/68 R |
| 4,401,938 | 8/1983 | Cronin | 290/38 R |
| 4,481,459 | 11/1984 | Mehl et al. | 290/38 R |

*Primary Examiner*—Mark O. Budd

*Assistant Examiner*—Emanuel T. Voeltz

*Attorney, Agent, or Firm*—Burns, Doane, Swecker & Mathis

[57] ABSTRACT

Disclosed are a starter and power generator which starts an engine and which is subsequently driven by the engine to generate power, and a motor used in the starter, in particular, a self-controlled commutatorless motor in which a rotating magnetic field is developed across the stator in accordance with an angle of rotation of the rotor. Normally, output matching means is connected to the three phase windings of the stator, whereby an alternator is defined by the combination of the rotor, the stator and the output matching means. However, in response to a starting command, energizing means is substituted for the output matching means, whereby a combination of the rotor, the stator, timing means and energizing means form a commutatorless motor. Thus, subsequent to starting the engine, the motor is driven by the engine to generate power. When the arrangement functions as a commutatorless motor and when a single phase excitation is employed for a lap winding of plurality of phases to define the individual magnetic poles of the stator, a forced starting operation is achieved by causing an energization of at least one of the phases of the stator coils if the starting command is issued at a timing where the energization of all the phases of the stator coils is interrupted.

16 Claims, 8 Drawing Sheets

STARTER AND POWER GENERATOR AND ASSOCIATED MOTOR

BACKGROUND OF THE INVENTION

The invention relates to a starter and power generator which starts an engine and which then generates power utilizing the drive from the engine, and a motor which may be used in such starter, and in particular, to a self-controlled commutatorless motor which produces a rotating magnetic field within a stator in accordance with an angle of rotation of a rotor.

An engine which is mounted on an automobile, for example, is provided with a starter for starting the operation of the engine as well as a power generation system which generates power during the rotation of the engine to charge a battery.

As is known, when the rotary shaft of a d.c. motor is rotated by an external drive, there may be obtained a d.c. output. Thus, a d.c. motor may be maintained in coupled relationship with an output shaft of an engine, thereby allowing the motor to operate as a d.c. generator ("dynamo") after the engine has started. In fact, there has been an arrangement referred to as a "starter dynamo" which combined a starter and a power generation system.

However, the use of a commutator in a dynamo has a drawback that it is not amenable to a high speed operation. Specifically, a pulley ratio (the ratio of numbers of revolutions between a generator and an engine) must be chosen so as to enable the operation of the dynamo when the engine operates at its maximum speed. This causes a difficulty that a battery may be discharged as a result of failure of providing sufficient power generation if an automobile which carries such dynamo is obliged to run at low speed over an increased length of time due to traffic stagnation. For this reason, an arrangement referred to as "starter dynamo" has disappeared, and has been replaced by a combination of an alternator of a reduced weight and size which is capable of providing a high output and serving as a power generator and a d.c. direct wound motor as a starter which provides a starting torque of an increased magnitude and allows a high speed rotation.

On the other hand, the recent trend toward the forward wheel drive of automobiles requires a greater reduction in the weight and size of as well as a higher output from an engine and installations thereon. Thus, the separate provision of the alternator as a power generator and a d.c. direct wound motor as a starter stands in the way to satisfy such requirement.

SUMMARY OF THE INVENTION

It is an object of the invention to provide a starter and power generator which starts an engine and which subsequently operates to generate power by utilizing the drive from the engine while affording a sufficient output when operating at a low speed.

The above object is accomplished in accordance with the invention by providing a starter and power generator comprising a rotor including a plurality of magnetic poles; first support means for rotatably carrying the rotor; means for engaging the rotor with a rotary shaft of an engine; a stator including a three phase winding; second support means for fixedly supporting the stator in surrounding relationship with the rotor; timing means for controlling the timing when each of the three phase windings of the stator is to be energized; energizing means for energizing the respective windings of the stator in accordance with the timing determined by the timing means; output matching means for receiving individual outputs from the three phase windings of the stator; input means for entering a starting command; and connection means for connecting the output matching means with the respective three phase windings of the stator and for connecting the energizing means in place of the output matching means in response to a starting command.

With the described arrangement, the connection means normally connects the output matching means to the individual three phase windings of the stator, whereby the combination of the rotor, the stator and the output matching means constitute together an alternator. However, in response to a starting command, the output matching means is replaced by the energizing means, whereby the combination of the rotor, the stator, the timing means and the energizing means constitute together a commutatorless motor. In this manner, after starting an engine, the power can be generated by utilizing the drive from the engine.

When operating as the alternator, the absence of a commutator enables a rotation up to a higher rotational speed while affording a sufficient output at a low speed operation.

Alternatively, when operating as a starting motor, an engaging and disengaging mechanism such as a slidable pinion mechanism which operates only upon starting to engage the rotary shaft of the motor with an input shaft of an engine can be dispensed with, contributing to a reduction in the size and weight thereof. In addition, a technical advantage is obtained in that electromagnetic noises caused by relative sliding movement between the commutator and brushes and which present a problem in a usual d.c. motor are eliminated.

Considering the arrangement of the invention as a commutatorless motor, suitable angle detecting means is provided which detects an angle of rotation of the rotor, to excite each magnetic pole of the stator per phase, thus developing a rotating magnetic field. Where each magnetic pole of the stator includes stator coils of a plurality of phases in a lap winding, more than one phases may be excited simultaneously to produce magnetic poles which may be excited to opposite phases, thus causing a drastic reduction in the torque developed by the rotor or causing a failure to rotate the rotor at all. Thus, a single phase excitation must be employed in which a single phase is excited at one time. In this manner, a dead zone is used between the excitation of the individual phases during which no phase is excited in order to avoid any overlapping of excitation between different phases.

However, where such dead zones are used, no stator coil of any phase is excited if the angle detecting means detects an angle of rotation within such dead zone when the energization of the commutatorless motor is initiated, thus failing to rotate the rotor forever.

To accommodate for this possibility, the rotation of the rotor in a normal manner is assured in accordance with the invention where a single phase excitation of stator coils in a lap winding is utilized by providing an arrangement comprising a rotatable rotor having a plurality of magnetized poles, a stator disposed in surrounding relationship with the rotor and having a plurality of poles, stator coils connected in a plurality of phases for exciting the plurality of magnetic poles on the stator; means for controlling the energization of the stator coils, first energization timing means for controlling the timing of energizing the respective phase of the stator coils in accordance with an angle of rotation of the rotor; second energization timing means responsive to the energization controlling means by establishing a timing to energize at least one phase of the stator coils if the first timing means fails to establish a timing to energize any one of the phases of the stator coils; and energizing means responsive to the energization controlling means to energize stator coils of the respective phases in accordance with the timing established by either the first or the second energization timing means.

With this arrangement, when the energization controlling means has set up an energization, if the first energization timing means fails to establish a timing to energize stator coils of any phase, the second energization timing means is effective to establish a timing to energize at least one phase of the stator coils, thus assuring that a rotation of the rotor occurs in a normal manner even when utilizing a single phase excitation of stator coils in a lap winding.

Above and other objects and features invention will become apparent from the following description of embodiments thereof with reference to the drawings.

DESCRIPTION OF EMBODIMENTS

Figure 1A:
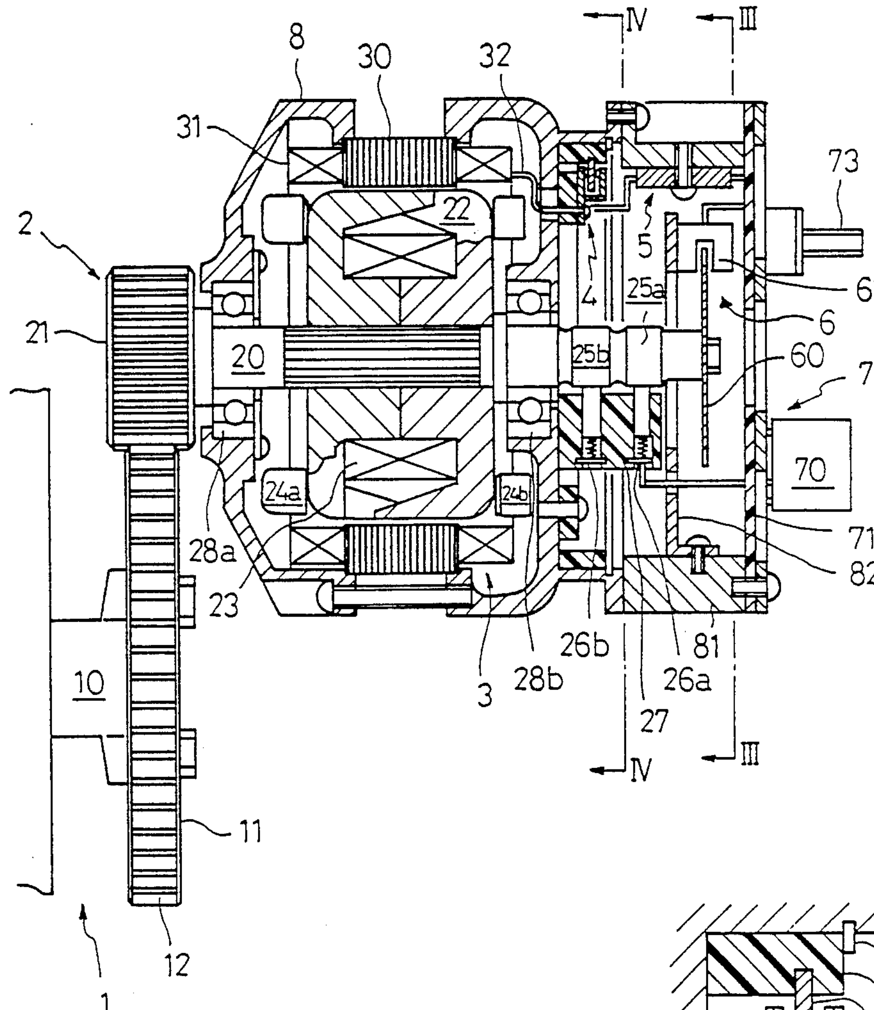
FIG. 1*a* is a cross section of a starter and power generator according to one embodiment of the invention, the section being taken along the line IA—IA shown in FIG. 2.

FIG. 1*a* is a cross section of a generator according to one embodiment of the invention. The arrangement includes an engine 1, a rotor 2, a stator 3, a switching unit 4, a commutation and energization control unit 5, a timing unit 6, an input/output unit 7 and a housing 8.

The engine 1 includes a crankshaft 10 on which is fixedly mounted a flywheel 11 which is peripherally formed with a ring gear 12 meshing with a pinion gear 21 which is in turn fixedly mounted on the rotary shaft of the rotor 2. In the embodiment, the gear ratio is 3:1.

The rotary shaft 20 of the rotor 2 is rotatably carried within the housing 8 by means of bearings 28*a* and 28*b*, with a 12-pole core 22 of Randle type fixedly mounted on the rotary shaft intermediate its length. The core 22 embraces a rotor coil 23 with a pair of cooling fans 24*a* and 24*b* mounted on the opposite sides thereof. The energization of the rotor coil 23 takes place through a slip ring 25*a* and a brush 26*a* and also through a slip ring 25*b* and a brush 26*b*. The brushes 26*a* and 26*b* are supported by a brush holder 27 which is secured to the housing 8, and are urged against the slip rings 25*a*, 25*b*, respectively, under a given pressure by means of springs which are disposed behind them.

Figure 1B:
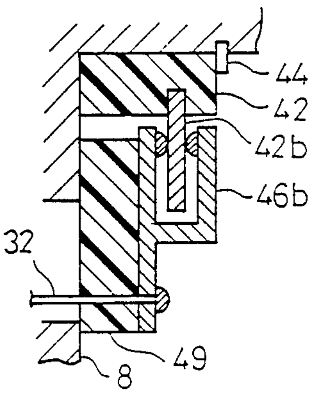
FIG. 1*b* is a fragmentary section showing part of FIG. 1*a* in detail.

The stator 3 is supported by the housing 8 so as to surround the pole core 22 of the rotor 2. It comprises a laminated stator core 30 having three phase stator coils 31 disposed thereon and connected in a star connection. In the description to follow, the phases will be referred to as U, V and W. The ends of the stator coils of the respective phases define lead wires, which are connected to selected contacts of the switching unit 4. FIG. 1*b* illustrates the connection between a lead wire 32 associated with the stator coil of phase V and a fixed contact 46*b* of the switching unit 4. The switching unit 4 comprises four changeover switches associated with the phases U, V and W and the neutral, and a switching mechanism.

Figure 4:
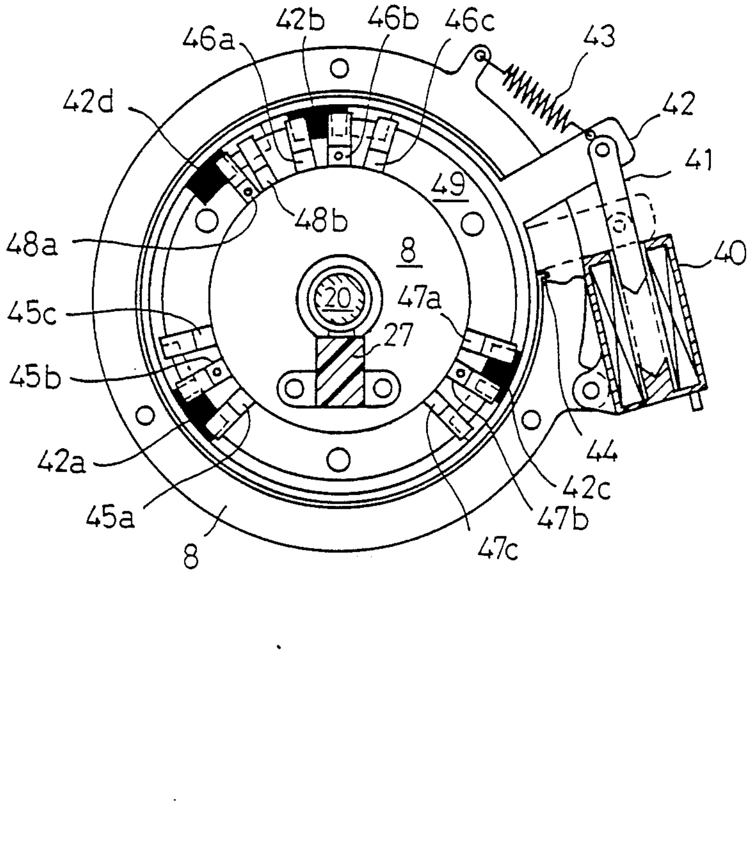
FIG. 4 is a cross section taken along the line IV—IV shown in FIG. 1*a;*

Referring to FIG. 4, which represents a cross section taken along the line IV—IV shown in FIG. 1*a*, a changeover switch for phase U comprises fixed contacts 45*a*, 45*b* and 45*c* and a transfer contact 42*a*. Similarly, a changeover switch for phase V comprises fixed contacts 46*a*, 46*b* and 46*c* and a transfer contact 42*b*, and a changeover switch for phase W comprises fixed contacts 47*a*, 47*b* and 47*c* and a transfer contact 42*c*. A changeover switch for the neutral comprises fixed contacts 48*a* and 48*b* and a transfer contact 42*d*. A lead wire extending from the phase U is soldered to the fixed contact 45*b*, a lead wire from the phase V is soldered to the fixed contact 46*b*, a lead wire from the phase W is soldered to the fixed contact 47*b* and a lead wire from the neutral is soldered to the fixed contact 48*a*, respectively. Each fixed contact is fixedly mounted on an insulating plate 49 which is secured to the housing 8 while each transfer contact is fixedly mounted on an insulating ring 42 which is rotatably mounted on a cylindrical portion of the housing. The insulating ring 42 includes an arm which projects outward through a notch formed in the housing 8, and hence the extent of its angular movement is limited by the notch. A locking C-ring is shown at 44. The free end of the arm extending from the insulating ring 42 is engaged by a plunger 41 of a solenoid 40 and also by one end of a coiled tension spring 43, the other end of which is anchored to a tab formed on the housing 8, thus urging the insulating ring 42 to rotate counter-clockwise. The solenoid 40 is fixedly mounted on the housing 8, and acts to rotate the insulating ring 42 clockwise against the spring 43 when energized.

FIG. 1*b* is a cross section illustrating the engagement between the fixed contact 46*b* and the transfer contact 42*b*, which form one of the changeover switches, corresponding to the phase V. Each fixed contact is Y-shaped in transverse section so as to hold an associated transfer contact sandwiched under a given pressure. In a region adapted for abutment against the transfer contact, the fixed contact is provided with hemi-spherical formations to provide a smooth engagement and disengagement. Specifically, when the solenoid 40 is deenergized, a conduction is established between fixed contacts 45*b* and 45*a*, between fixed contacts 46*b* and 46*a* and between the fixed contacts 47*b* and 47*a* through the respective transfer contacts while when the solenoid 40 is energized, a conduction is established between the fixed contacts 45*b* and 45*c*, between the fixed contacts 46*b* and 46*c*, and between the fixed contacts 47*b* and 47*c*, and between the fixed contacts 48*a* and 48*b* through the respective transfer contacts. The fixed contacts 45*a*, 45*c*, 46*a*, 46*c*, 47*a* and 47*c* are connected to the rectifier and energization control unit 5. The fixed contact 48*b* is connected to a common positive electrode 72 (see FIG. 2) on a printed circuit board 71.

Figure 3:
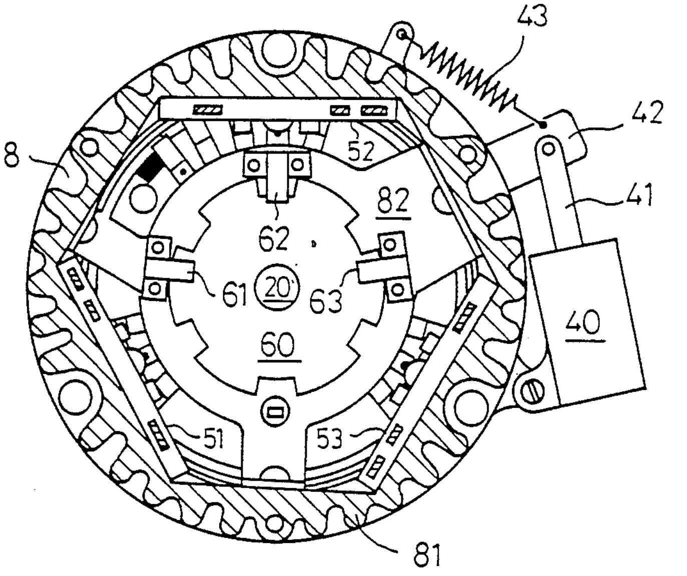
FIG. 3 is a cross section taken along the line III—III shown in FIG. 1*a;*

The rectifier and energization control unit 5 comprises three hybrid IC's 51, 52 and 53, each including CMOS FET's and diodes. FIG. 3 is a cross section taken along the line III—III shown in FIG. 1*a*. As shown, each hybrid IC is disposed on a rear bracket 81 adjacent to the changeover switch of phase U, V or W, respectively. The rear bracket 81 is secured to the housing 8 and is formed with a multiplicity of heat radiating fins along its outer periphery. The detail of such hybrid IC's will be described later.

The timing unit 6 comprises a slitted plate 60 threadably engaged with the rotary shaft 20 of the rotor 2, and three photo-sensors 61, 62 and 63 which are operative to detect a slit formed in the slitted plate 60. The photo-sensors 61, 62 and 63 are disposed on a sensor bracket 82 secured to the rear bracket 81 in a manner illustrated in FIG. 3. The photo-sensors 61, 62 and 63 are interconnected with the hybrid IC's 51, 52 and 53 through a printed circuit board 71.

Figure 2:
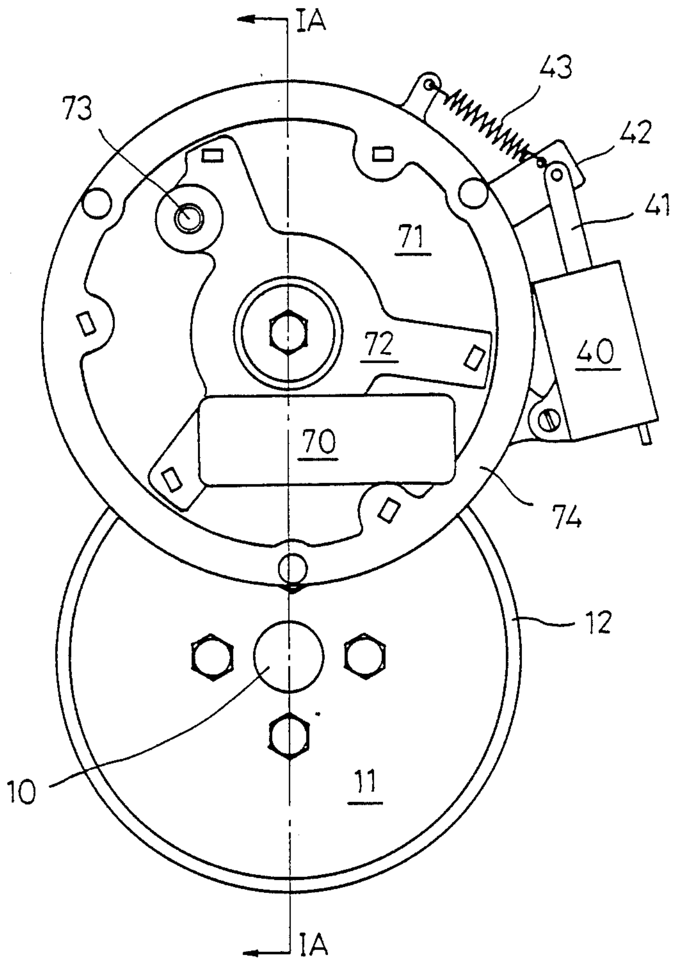
FIG. 2 is a right-hand side elevation of FIG. 1*a;*

FIG. 2 represents a right-hand side elevation of FIG. 1*a*. In other words, FIG. 1*a* is a cross section taken along the line IA—IA shown in FIG. 2. The printed circuit board 71 is screwed into the rear bracket 81 and is retained in place by a ring conductor 74 which defines a common ground, the board 71 being provided with a regulator 70. The board 71 is also formed with a common positive electrode 72 which is formed with a power supply input/output terminal 73 which is adapted to be connected to the positive terminal of a battery BT (FIG. 5).

Figure 5:
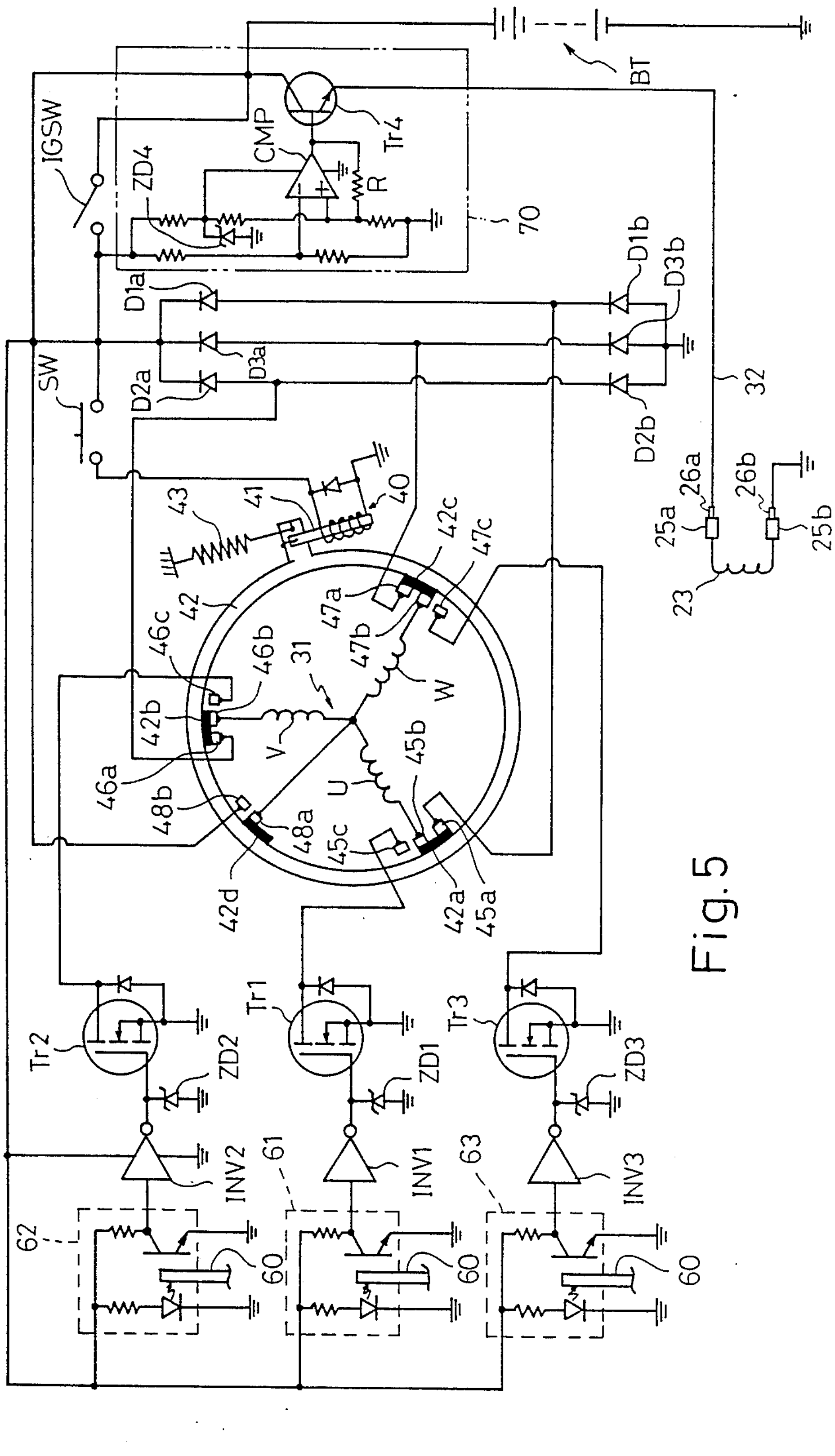
FIG. 5 is a block diagram of the electrical circuit of the arrangement shown in FIG. 1*a;*

Referring to FIG. 5, the electrical circuit arrangement of the present embodiment will be described. In FIG. 5, the hybrid IC 51 includes diodes D1*a*, D1*b*, an inverter INV1, a Zener diode ZD1, CMOS FET Tr1 and its associated bypass diode. Similarly, the hybrid IC 52 includes diodes D2*a*, D2*b*, an inverter INV2, a Zener diode ZD2, CMOS FET Tr2 and its associated bypass diode; and the hybrid IC 53 includes diodes D3*a*, D3*b*, an inverter INV3, a Zener diode ZD3, CMOS FET Tr3 and its associated bypass diode.

The diodes D1*a*, D1*b*, D2*a*, D2*b*, D3*a* and D3*b* constitute together a three phase full wave rectifier circuit. The cathodes of the diodes D1*a*, D2*a* and D3*a* are connected to the common positive electrode 72 while the anodes of the diodes D1*b*, D2*b* and D3*b* are connected to the common ground 74.

It will be noted that Tr1, Tr2 and Tr3 operate as switching elements which control the energization of the stator coils of the phases U, V and W, respectively. The combination of the photo-sensor 61 and inverter INV1 defines a driver circuit for Tr1. Similarly, the combination of the photo-sensor 62 and inverter INV2 as well as the combination of the photo-sensor 63 and inverter INV3 form a driver circuit for Tr2 and Tr3, respectively. Zener diodes ZD1, ZD2 and ZD3 function as an input limiter for an associated FET. The regulator 70 comprises a transistor Tr4, a Zener diode ZD4, a comparator CMP and associated resistors. The Zener diode ZD4 serves establishing a reference voltage which is applied to the positive terminal of the comparator CMP. The comparator CMP compares an input applied to its positive terminal against an input applied to its negative terminal, and delivers an output of H level when the positive input is higher and provides an output of L level otherwise. In this arrangement, a resistor R functions to provide a hysteresis in the operation of the comparator CMP. An output from the comparator CMP is applied to the base of the transistor Tr4, which is turned on and off in response to the application of an H level and L level, respectively. The collector of the transistor Tr4 is connected to the positive terminal of the battery BT while its emitter is connected to the brush 26*a*.

In operation, when an ignition switch IGSW is closed, the comparator CMP of the regulator 70 delivers an H level, whereby the transistor Tr4 is turned on, thus energizing the rotor coil 23 through the brushes 26*a*, 26*b* and the slip rings 25*a*, 25*b*, thus exciting the pole core 22.

Subsequently, when a start switch SW is closed, the solenoid 40 is energized to rotate the insulating ring 42 clockwise. Thereupon, a conduction is established between the fixed contacts 45*b* and 45*c*, between the fixed contacts 46*b* and 46*c*, between the fixed contacts 47*b* and 47*c* and between the fixed contacts 48*a* and 48*b* through the transfer contacts 42*a*, 42*b*, 42*c* or 42*d*, respectively. Thus, the stator coils of the phases U, V and W are connected to the drains of Tr1, Tr2 and Tr3, respectively, while the battery voltage is applied to the neutral, allowing the arrangement of the invention to function as a starter motor.

Figure 6:
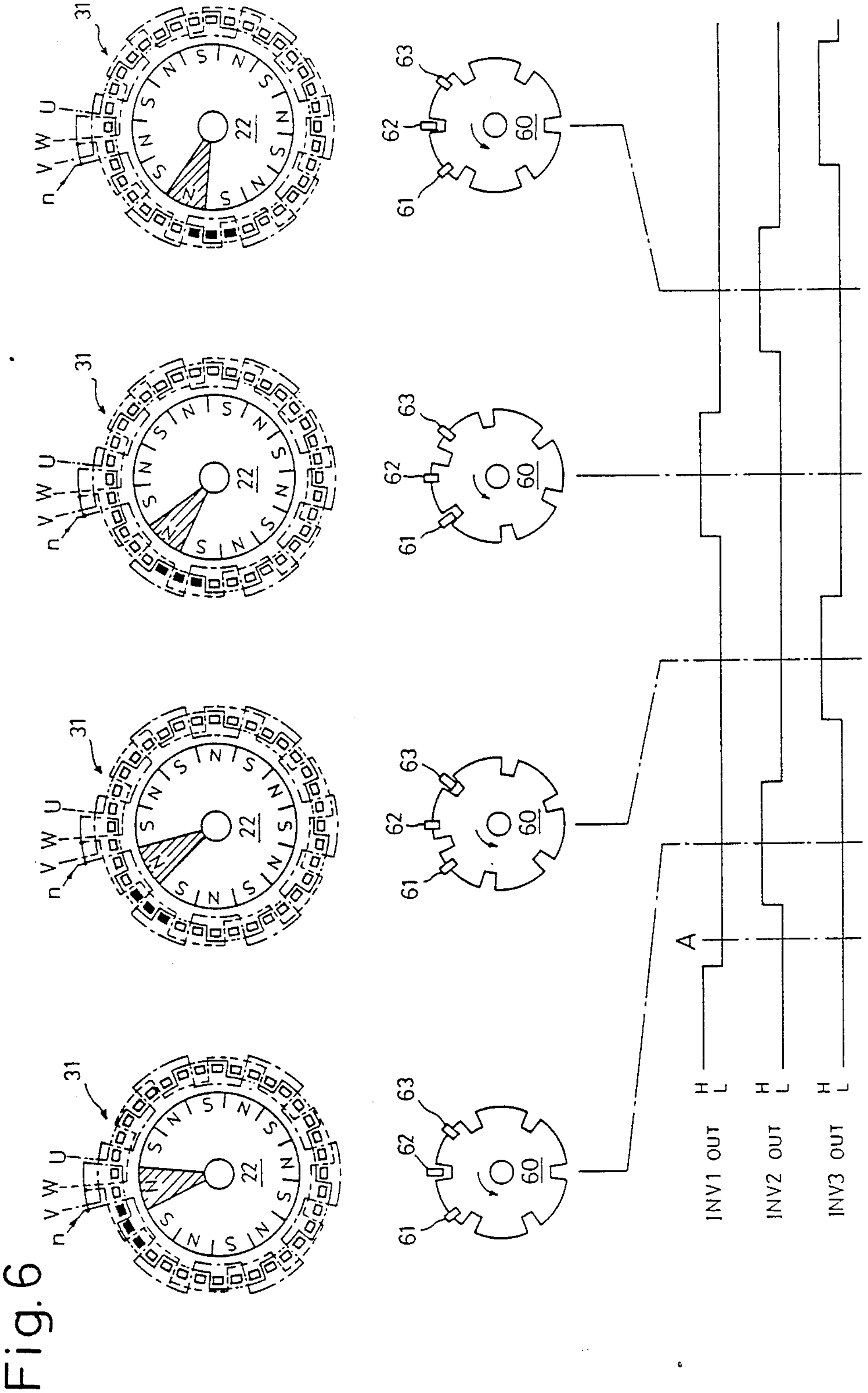
FIG. 6 schematically and graphically illustrates the principle of operation of the arrangement of the embodiment as a starter motor.

The operation of the starter motor will be described with reference to FIG. 6 where a movement of one N-pole (shown hatched) of the pole core 22 is illustrated. Several views shown in FIG. 6 are to be considered from the leftmost end in sequence. Specifically, the leftmost view in FIG. 6 illustrates that the photo-sensor 62 has detected a slit in the slitted plate 60. At this time, other photo-sensors 61 and 62 are intercepted. Accordingly, only the inverter INV2 delivers an H level, which output is applied to the gate of Tr1, whereby only the phase V is energized. Accordingly, the N-pole in question (shown hatched) is attracted to areas of the stator core 30 which are excited to be S-pole and shown as small rectangles in black. The stator core 30 is excited to be S- and N-pole alternately every third rectangle, and thus a magnetic attraction is effective over the entire periphery to exert a strong torque upon the rotor 2, which is therefore rotated counter-clockwise. Since the slitted plate 60 rotates integrally with the rotor 2, the photo-sensor 62 becomes intercepted while the photo-sensor 63 becomes effective to detect a slit. Then the energization of the phase V is interrupted while the phase W begins to be energized, whereby the magnetic field of the stator core 30 rotates through 20° counter-clockwise. The N-pole in question is then attracted toward S-poles on the stator core 30 which are displaced 20° and shown in black. When the rotor 2 rotates through 20° since the initiation of energization of the phase W, the photo-sensor 63 is intercepted while the photo-sensor 61 becomes effective to detect a slit. Thereupon the phase W ceases to be energized while the phase U begins to be energized. Accordingly the magnetic field of the stator core 30 rotates through a further 20° counter-clockwise, and the N-pole in question follows S-poles which are displaced 20° and shown in black. In this manner, a rotating magnetic field is developed across the stator 3 during the rotation of the rotor 2, and the rotor 2 follows it, whereby the rotating field is accelerated.

The pinion 21 fixedly mounted on the rotary shaft 20 of the rotor 2 is in meshing engagement with the ring gear 12 around the flywheel 11 which is fixedly mounted on the crankshaft 10 of the engine 1, whereby the rotation of the rotor 2 is effective to start the engine 1. As the engine 1 starts, the rotor 2 is then driven for rotation by the engine 1 through the ring gear 12 and the pinion 21.

Returning to FIG. 5, when the start switch SW is turned off, the solenoid 40 is deenergized, and the insulating ring 42 is driven counter-clockwise to be returned to its position shown under the resilience of the coiled tension spring 43. Then, a conduction is established between the fixed contacts 45*a* and 45*b* through the transfer contact 42*a*, and similarly between the fixed contacts 46*a* and 46*b* through the transfer contact 42*b*, and between the fixed contacts 47*a* and 47*b* through the transfer contact 42*c* while the fixed contacts 48*a* is insulated from the fixed contact 48*b*. In other words, the phase U is connected to the junction between the anode of the diode D1*a* and the cathode of the diode D1*b*; the phase V is connected to the junction between the anode of the diode D2*a* and the cathode of the diode D2*b*; and the phase W is connected to the junction between the anode of the diode D3*a* and the cathode of the diode D3*b*.

Under this condition, the rotor coil 23 serves as a field coil to develop a rotating magnetic field, inducing an electromotive force of three phase alternating current in the stator coils 31. The electromotive force is rectified by the full wave rectifier comprising the diodes D1*a*, D1*b*, D2*a*, D2*b*, D3*a* and D3*b*, and is used to charge the battery BT through the ignition switch IGSW and is also applied to the regulator 70. Thus, the above arrangement now functions as an alternator.

The electromotive force which is developed within the stator coil 31 increases substantially in proportion to the rotational speed of the rotor 2, but as the magnitude of the current passing through the regulator 70 increases to a point that the voltage applied to the negative terminal of the comparator CMP exceeds the reference voltage, an output from the comparator CMP changes to its L level, whereby the transistor Tr4 becomes cut off. The rotor coil 23 then ceases to be energized to remove the rotating magnetic field, whereby the electromotive force decreases. As the magnitude of the electromotive force is reduced, the comparator CMP again delivers an H level to render the transistor Tr4 conductive, allowing the rotor 2 to develop the rotating magnetic field to induce the electromotive force in the stator coil 31. By repeating such operation, the regulator 70 delivers a substantially constant voltage to charge the battery BT.

Figure 7:
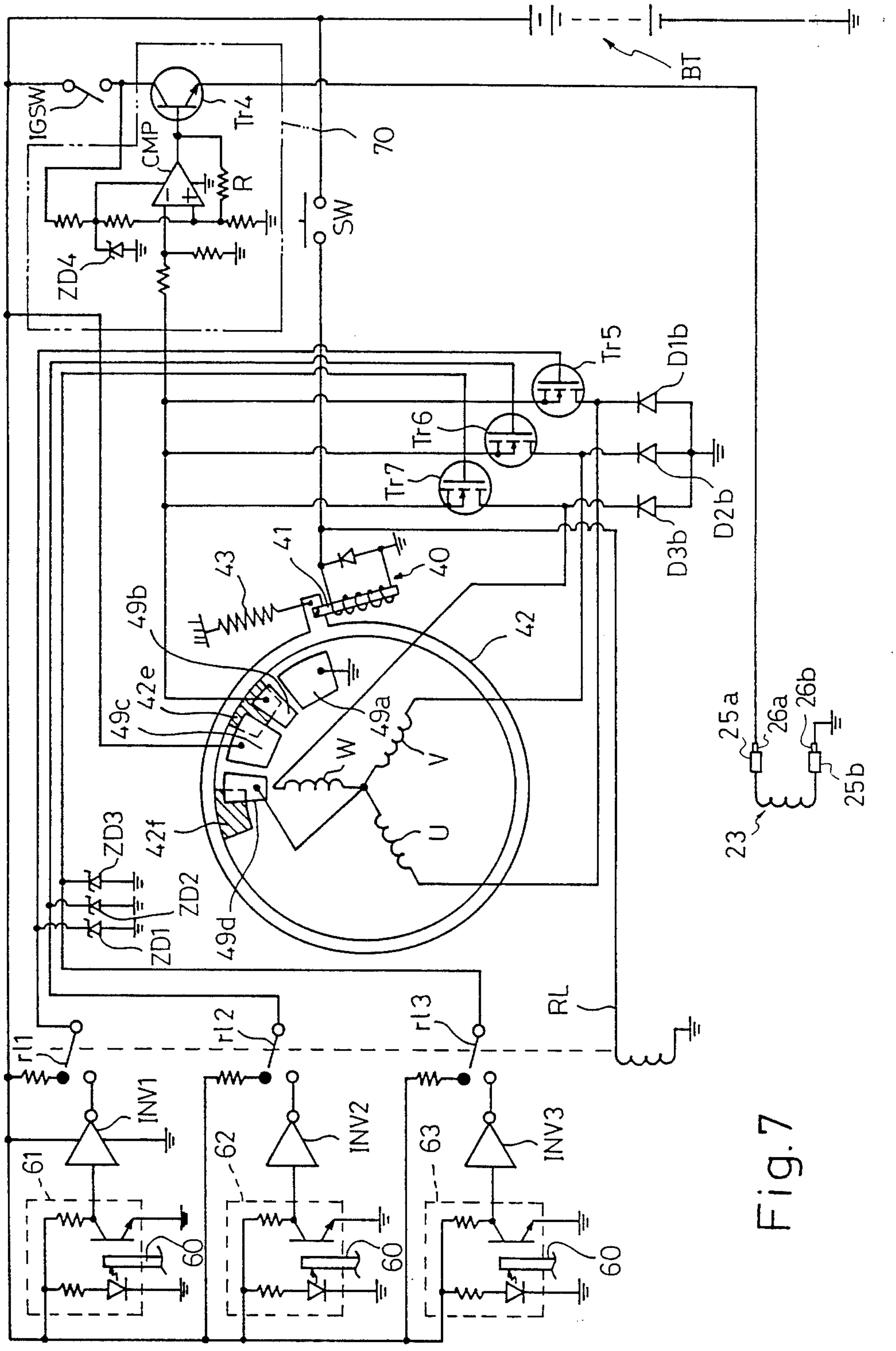
FIG. 7 is a block diagram of a first modification.

FIG. 7 shows a modification of the described electrical arrangement where similar parts are designated by like reference characters as before. In this embodiment, recognizing that FET provides an equivalent functioning as a diode when an H level is applied to its gate, the combination of diode D1*a* and FET Tr1 is replaced by FET Tr5, the combination of diode D2*a* and FET Tr2 is replaced by FET Tr6 and the combination of diode D3*a* and FET Tr3 is replaced by FET Tr7, respectively. At the same time, the gate of the respective FET's is connected to relay contacts rl1, rl2 and rl3, thus modifying the changeover switch arrangement. The relay contacts rl1, rl2 and rl3 are driven by a relay RL. When the relay RL is deenergized, an H level is applied to the gate of the respective FET's, while when the relay is energized, output from the inverters INV1, INV2 and INV3 are applied to the gate of the corresponding FET's. A changeover switch comprises four fixed contacts 49*a*, 49*b*, 49*c* and 49*d* fixedly mounted on an insulating plate 49, and transfer contacts 42*e* and 42*f* fixedly mounted on an insulating plate 42. The fixed contact 49*a* is connected to the ground; the fixed contact 49*b* is connected to the common positive electrode 72; the fixed contact 49*c* is connected to the positive electrode of the battery BT; and the fixed contact 49*d* is connected to the neutral point.

In operation, as the ignition switch IGSW is closed, the rotor coil 23 is energized to excite the pole core 23. Subsequentially when the start switch SW is closed, the solenoid 40 and the relay RL are energized. A conduction is then established between the fixed contacts 49*a* and 49*b* and between the fixed contacts 49*c* and 49*d* to apply the battery voltage to the neutral point. An output from the inverter INV1 is applied to the gate of Tr5, an output from the inverter INV2 is applied to the gate of Tr6, and an output from the inverter INV3 is applied to the gate of Tr7, respectively, whereby the rotor 2 rotates in the same manner as before.

When the start switch SW is turned off, the solenoid 40 and the relay RL are deenergized, whereupon a conduction is established between the fixed contacts 49*b* and 49*c*, applying an H level to the gates of Tr5, Tr6 and Tr7. Under this condition, the respective FET's function as diodes, and the rotor 2 is driven for rotation by the engine 1 to induce an electromotive force within the stator coil 31, thus charging the battery BT in the same manner as mentioned previously.

In the described modification, the relay RL is utilized to switch a gate input of each FET, but the provision of such relay RL can be dispensed with by providing suitable transfer contacts on the insulating plate 49 and the insulating ring 42 since the relay RL is energized and deenergized at the same time as the solenoid 40.

Returning to FIG. 6, when the arrangement of the embodiment is to operate as the starter motor, it will be noted that there exists a dead zone where none of the photo-sensors 61, 62 and 63 is able to detect a slit. The dead zone remains without effect during the rotation of the rotor 2 due to the inertia (even though it is related to the torque developed). However, if the start switch SW is closed when all of the photo-sensors 61, 62 and 63 are positioned in the dead zone, for example, at point A shown in FIG. 6, none of the phases of the stator coils 31 is energized, and hence the rotor 2 cannot initiate its rotation.

Figure 8:
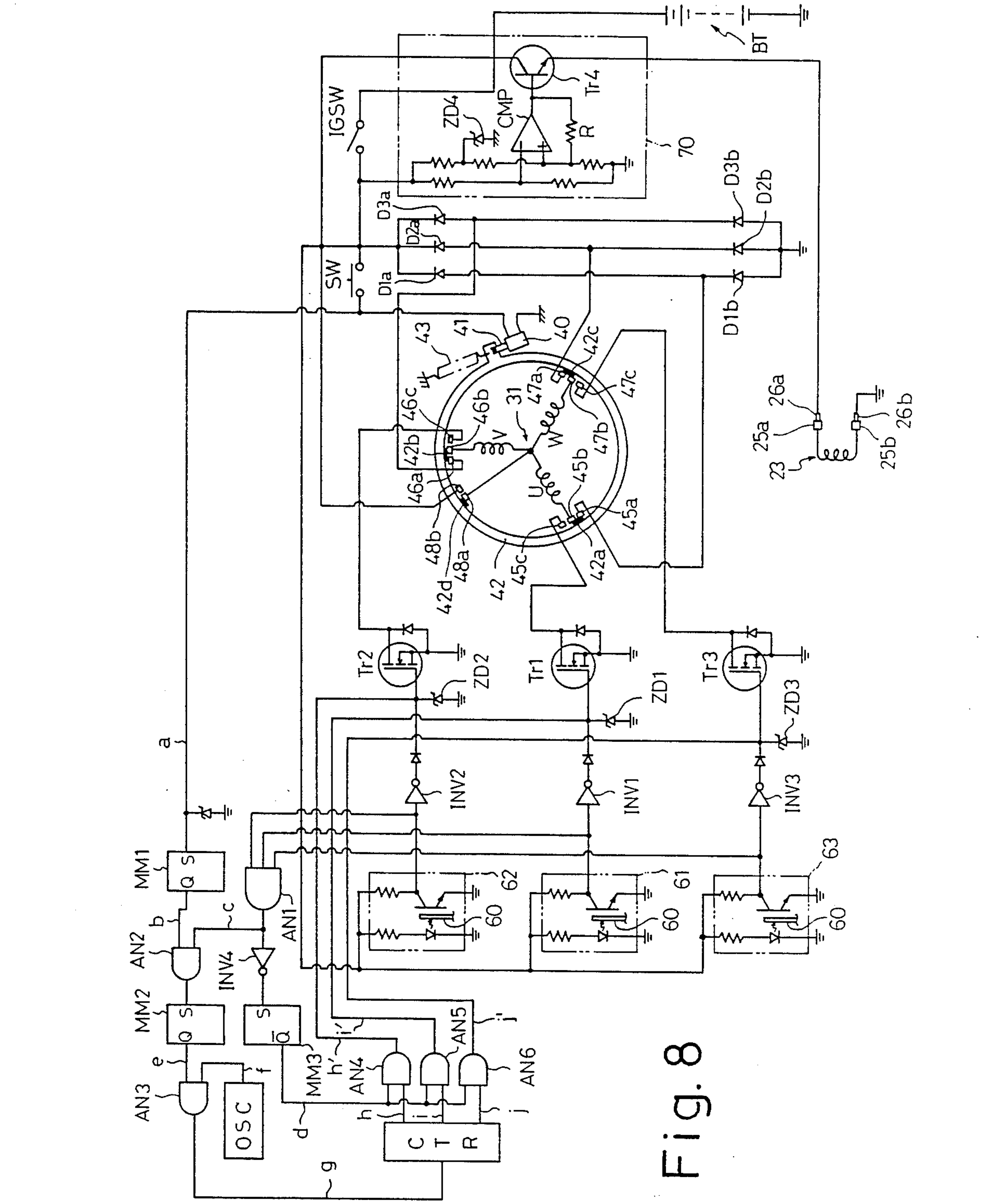
FIG. 8 is a block diagram of a second modification.

This represents an inconvenience which results from the elimination of an overlapped energization of plurality of the phases which in turn cause a reduction in the torque developed, because of a lap winding employed for the stator coils 31 of the respective phases on the stator core 30. A second modification which is proposed according to the invention which effectively eliminates such inconvenience is illustrated by an electrical circuit shown in FIG. 8 where similar parts are designated by like reference characters as used in FIGS. 5 and 7.

The electrical circuit of this modification is equivalent to the electrical circuit shown in FIG. 5 to which AND gates AN1 to AN3, an inverter INV4, monostable multivibrators MM1 to MM3, an oscillator OSC and a decade counter CTR are added. Specifically, the hybrid IC 51 includes CMOS FET Tr1, diodes D1*a* and D1*b*, a Zener diode ZD1, an inverter INV1, an AND gate AN5, a diode connected to the output of the inverter INV1, and a diode connected between the source and the drain of Tr1. The hybrid IC 52 includes CMOS FET Tr2, diodes D2*a* and D2*b*, a Zener diode ZD2, an inverter INV2, an AND gate AN4, a diode connected to the output of the inverter INV2, and a diode connected between the source and the drain of Tr2. The hybrid IC 53 includes CMOS FET Tr3, diodes D3*a* and D3*b*, a Zener diode ZD3, an inverter INV3, an AND gate AN6, a diode connected to the output of the inverter INV3, and a diode connected between the source and the drain of Tr3. A printed circuit board 71 (on the backside from FIG. 2) includes AND gates AN1, AN2 and AN3, the inverter INV4, monostable multivibrators MM1, MM2 and MM3, a Zener diode connected to the input of the multivibrator MM1, the oscillator OSC and the decade counter CTR.

Applied to the gate of Tr1 are an output from the photo-sensor 61 through the inverter INV1 and diode as well as an output from AND gate AN5. Applied to the gate of Tr2 are an output from the photo-sensor 62 through the inverter INV2 and its associated diode as well as an output from the AND gate AN4. Applied to the gate of Tr3 are an output from the photo-sensor 63 through the inverter INV3 and its associated diode as well as an output from the AND gate AN6.

A combination of the gates AN1 to AN6, inverter INV4, monostable multivibrators MM1 to MM3, oscillator OSC and decade counter CTR forms together a forced starter circuit which becomes operative when the start switch SW is closed within the dead zone mentioned above.

Figure 9:
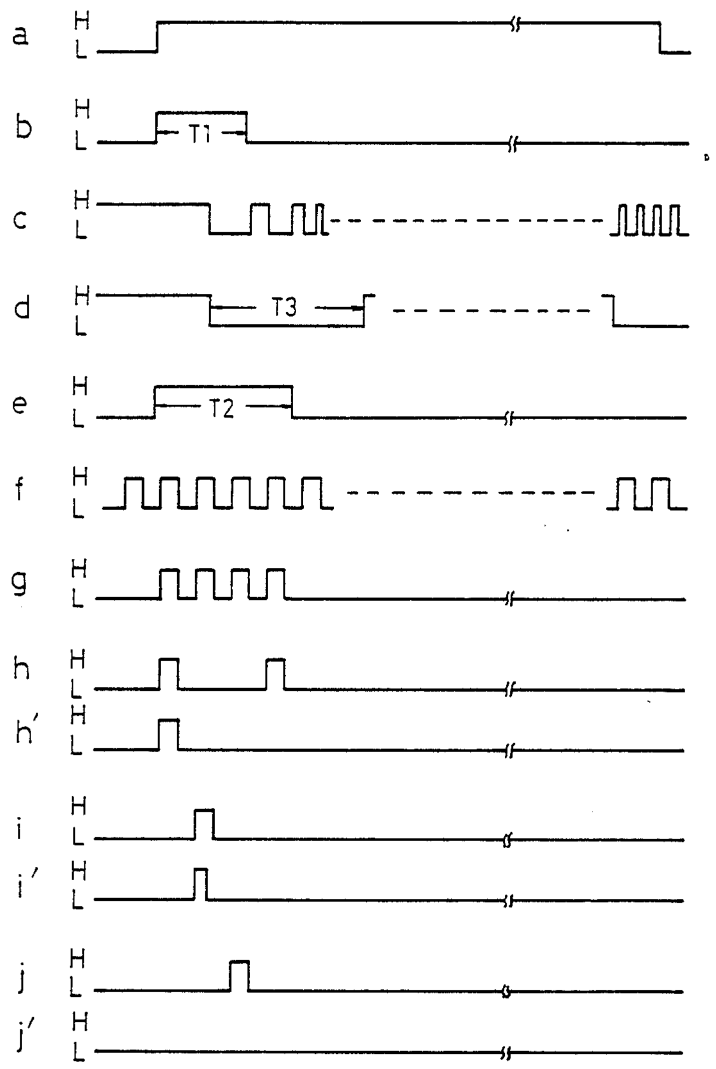
FIG. 9 is a series of timing charts illustrating the operation of the second modification.

The operation of this modification will now be described with reference to various waveforms shown in FIG. 9. When the start switch SW is closed, an input a to the monostable multivibrator MM1 rises to its H level, thus triggering it to deliver a pulse of H level having a pulse width T1 (*b*). In the dead zone, each of the photo-sensors 61, 62 and 63 delivers an H level, whereby an output c from the gate AN1 assumes its H level. The output b from the multivibrator MM1 and the output c from the gate AN1 are input to the gate AN2, which then delivers an H level. The multivibrator MM2 is triggered by a rising edge of an output from the gate AN2 to deliver a pulse of H level having a pulse width T2 which is longer than the width T1 (e). The oscillator OSC delivers a square wave having a period of about 0.5 sec (f). The output f and the output e from the multivibrator MM2 are input to the gate AN3. In the present embodiment, the time constant T2 of the multivibrator MM2 is chosen to be equal to approximately four times the period of the output from the oscillator OSC, and accordingly, an output g from the gate AN3 includes four or five pulses of H level.

The decade counter CTR is equivalent to a parallel connection of three ternary counters with serial outputs h, i and j derived from different bits. On the other hand, the output d from the multivibrator MM3 remains at its H level until the output c from the gate AN1 turns to its L level. When output d is at its H level, outputs h', i' and j' from the gates AN4, AN5 and AN6, respectively, are at the same level as the outputs h, i and j from the decade counter CTR. The output h' from the gate AN4 is applied to the gate of FET Tr2; the output i' from the gate AN5 is applied to the gate of FET Tr1; and the output j' from the gate AN6 is applied to the gate of FET Tr3. Thus, the phase V is energized when the output h' from the gate AN4 is at its H level; the phase U is energized when the output i' from the gate AN5 is at its H level; and the phase W is energized when the output j' from the gate AN4 is at its H level. This allows the rotor 2 to rotate, and the photo-sensors 61, 62 or 63 are able to detect a slit to deliver an L level. When either one of the photo-sensors 61, 62 and 63 delivers an L level, the output c from the gate AN1 turns to its L level. The output c is inverted by the inverter INV4 and the rising edge (or the falling edge before the inversion) triggers the multivibrator MM3, which then delivers a pulse of L level having a pulse width T3 which is substantially equal to the pulse width T2 (*d*). The output d from the multivibrator MM3 is applied to the gates AN4, AN5 and AN6, and hence the outputs h', i' and j' from the gates assume an L level after the photo-sensor 61, 62 or 63 delivers an L level.

Thus it will be seen that when the start switch SW is closed in a dead zone where none of the photo-sensors 61, 62 or 63 is able to detect a slit, the forced starter circuit establishes an energization of the stator coils 31, and when the photo-sensor 61, 62 or 63 becomes able to detect a slit, the energization of the stator coils is established in accordance with outputs from the photo-sensors in a normal manner.

In this modification, when the start switch SW is closed in the dead zone where none of the photo-sensors 61, 62, 63 is able to detect a slit, the forced starter circuit performs an electrical forced starting operation, but such starting operation may take place mechanically. Specifically, the sensor bracket 82 may be mounted in a rotatable manner and engaged with a mechanism which functions in the same manner as the mechanism which rotates the insulating ring 42 in the described embodiment so that the sensor bracket 82 may be rotated through a given angle when it is located in the dead zone. Subsequently, when a rotating magnetic field is developed, the sensor bracket is returned to its normal position. In this instance, the photo-sensors 61, 62, 63, the sensor bracket 82 and the mechanism which rotates it define the second energization timing means as referred to in the claims.

A modification is also contemplated in which a motor may be substituted for the solenoid 40 to rotate the insulating ring 42, but such modifications and variations need not be described in detail.

As described, in accordance with the invention, an alternator is normally formed by the rotor, the stator and the output matching means, and in response to a starting command, the output matching means is replaced by energizing means so that a combination of the rotor, the stator, the timing means and the energizing means forms a commutatorless motor. In this manner, after initially starting an engine, the arrangement of the invention can be driven by the engine to generate power. Since the rotor is not provided with a commutator, it has a high limit for its rotational speed while affording a sufficient output under a low speed operation.

When the arrangement is used as the starter motor, because the rotor is maintained in coupled relationship with an engine, an engaging and disengaging mechanism such as a slidable pinion mechanism used in a conventional starter for establishing an engagement between an input shaft of the engine and the rotary shaft of the motor only during the starting operation can be dispensed with, contributing to a reduction in the size and weight of the overall arrangement.

When the arrangement functions as a commutatorless motor, if the first energization timing means fails to establish a timing to energize any phase of the stator coils when the energization control means has set up an energization, the second energization timing means establishes a timing to energize, thus substantially eliminating any position where the starting operation is disabled for a single phase excitation of the stator coils disposed in a lap winding and thus assuring a reliable rotation of the rotor.

What we claimed is:

1. A starter and power generator comprising:

a rotor including a plurality of magnetic poles, a rotor winding for exciting said magnetic poles, and a rotary shaft;

a plurality of slip rings installed on said rotary shaft of said rotor and being connected to said rotor winding;

a plurality of brushes, which are in contact with said slip rings, for supplying an exciting current to said rotor winding through said slip rings;

first supporting means for rotatably supporting said rotary shaft of the rotor;

engaging means for engaging said rotary shaft of the rotor with a rotary shaft of an engine;

a stator including three phase windings which are arranged to surround an outer peripheral surface of said rotor;

second support means for fixedly supporting the stator in a surrounding relationship with the rotor;

timing means for establishing a timing to energize each of the three phase windings of the stator for generating with said three phase windings a rotating magnetic field at the said outer peripheral surface of the rotor;

energizing means for energizing the three phase windings of the stator in accordance with the timing established by the timing means;

output matching means for receiving individual outputs from the three phase windings of the stator;

input means for supplying a command to start the engine; and connection means for connecting the output matching means to the three phase windings of the stator to form an alternator and for substituting the energizing means for the output matching means for connection as a motor in response to a starting command.

2. A starter and power generator according to claim 1 in which the timing means includes a rotatable plate which is rotatable integrally with the rotor and carrying marks thereon for detecting the timing, and reading means for reading the marks.

3. A starter and power generator according to claim 1 in which the output matching means comprises rectifier means which functions as a full wave rectifier.

4. A starter and power generator comprising:

a rotor including a plurality of magnetic poles;

first supporting means for rotatably supporting the rotor;

engaging means for engaging the rotor with a rotary shaft of an engine;

a stator including three phase windings;

timing means for establishing a timing to energize each of the three phase windings of the stator;

energizing means for energizing the three phase windings of the stator in accordance with the timing established by the timing means;

output matching means for receiving individual outputs from the three phase windings of the stator;

input means for supplying a command to start the engine;

connection means for connecting the output matching means to the three phase windings of the stator and for substituting the energizing means for the output matching means for connection in response to a starting command; and second support means for fixedly supporting the stator in surrounding relationship with the rotor and for supporting the connection means at a location adjacent to the stator.

5. A starter and power generator according to claim 4 in which the connection means comprises a fixed contact mounted on the second support means, a transfer contact supported in a displaceable manner by the second support means and which is slidable for engagement with the fixed contact, and drive means for positioning the transfer contact at a first position in which the output matching means is connected to the three phase windings of the stator through the fixed contact and for driving the transfer contact to connect the energizing means to the three phase windings of the stator in response to a starting command.

6. A starter and power generator according to claim 5 in which the drive means comprises a solenoid mounted on the second support means.

7. A motor comprising a rotatable rotor having a plurality of magnetized poles;

a stator disposed in surrounding relationship with the rotor and having a plurality of magnetic poles;

a plurality of phases of stator coils for exciting the plurality of magnetic poles on the stator;

energization control means for controlling the energization of the stator coils;

first energization timing means for establishing a timing to energize the respective phases of the stator coils in accordance with an angle of rotation of the rotor;

second energization timing means operative to a failure of the first energization timing means to establish a timing to energize any one of the phases of the stator coils when the energization control means set up an energization, to establish a timing to energize at least one phase of the stator coils;

and energizing means responsive to the energization control means setting up an energization to energize the respective phases of the stator coils in accordance with the timing which is established by either the first or the second energization timing means.

8. A motor according to claim 7 in which the first energization timing means establishes a timing to energize each phase of the stator coils in a non-overlapped manner.

9. A motor according to claim 7 in which the first energization timing means comprises a rotatable plate which is rotatable integrally with the rotor and carrying a plurality of marks for detection of the timing to energize, and reading means for reading the marks.

10. A motor according to claim 7 in which the first energization timing means comprises a rotatable plate which is rotatable integrally with the rotor and carrying a plurality of marks for detecting the timing to energize, and reading means for reading the marks, whereby the first energization timing means establishes a timing to energize each phase of the stator coils in a non-overlapped manner.

11. A motor according to claim 7 in which the second energization timing means sequentially updates the timing to energize each phase of the stator coils.

12. A motor according to claim 11 in which the second energization timing means ceases to update the timing to energize in response to the first energization timing means establishing a timing to energize either one of the phases of the stator coils.

13. A motor according to claim 7 in which the second energization timing means establishes a timing to energize for a given time interval since the energization control means has set up an energization.

14. A motor according to claim 7 in which the second energization timing means sequentially updates the timing to energize each phase of the stator coils in a given sequence during a given time interval after the energization control means has set up an energization.

15. A motor according to claim 7 in which the second energization timing means establishes a timing to energize in a normal manner for a given time interval after the energization control means has set up an energization, and ceases to establish the timing to energize in response to the first energization timing means becoming operative to establish a timing to energize either phase of the stator coils.

16. A motor according to claim 7 in which the second energization timing means sequentially updates the timing to energize each phase of the stator coils in a given sequence during a given time interval after the energization control means has set up an energization and ceases to establish the timing to energize in response to the first energization timing means becoming operative to establish a timing to energize either phase of the stator coils.

* * * * *